United States Patent Office 3,321,265
Patented May 23, 1967

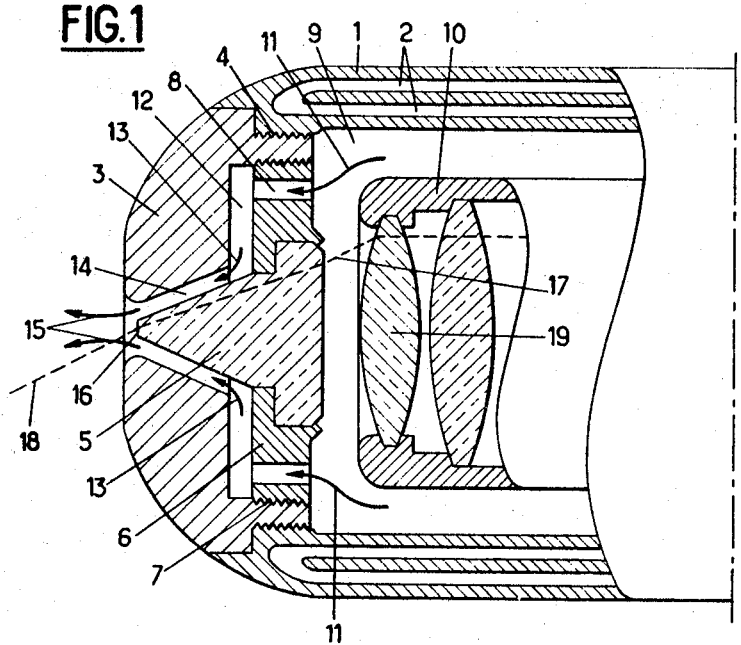
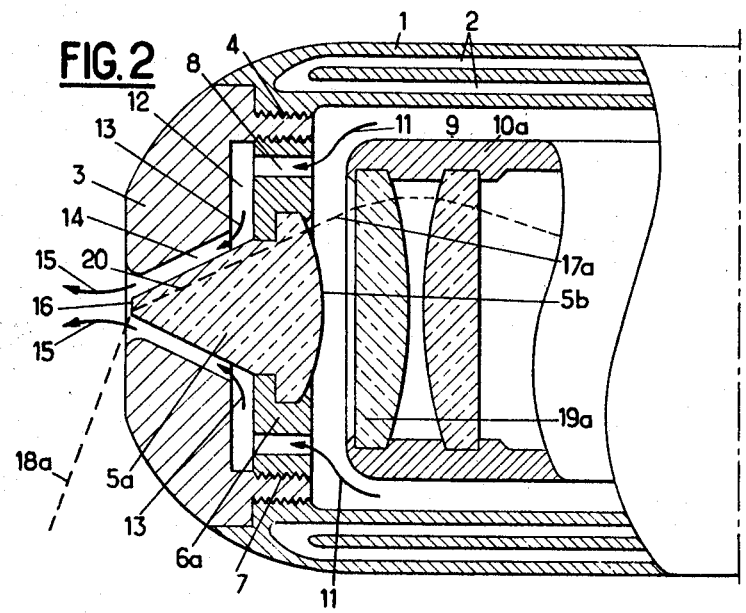

3,321,265
OPTICAL VIEWING DEVICE PROTECTED AGAINST HEAT AND IMPACT OF MOVING PARTICLES
Serge Clave and Marcel Clave, both of 9 Rue Olivier Metra, Paris, France
Filed June 20, 1963, Ser. No. 289,373
Claims priority, application France, June 27, 1962, 902,088, Patent 1,335,031
4 Claims. (Cl. 350—63)

Known optical devices, such as periscopes or endoscopes, designed to be inserted into high temperature environments, comprise cooling jackets through which a cooling fluid, such as water, is circulated. These cooling jackets are separated from the mountings for the said optical devices by an annular open space which admits a current of air which cools and protects the front surface of the objectives.

When inserted into such environments the objectives of these devices may be exposed to damage from solid particles projected thereagainst. It is therefore desirable to provide for these objectives a very small field orifice, so as to prevent these solid particles from being projected against a substantial portion of the front surface of the first lens of said objectives and also to prevent the optical elements constituting said devices from becoming overheated. This would be likely to occur if a wide open passage permitted heat rays to penetrate inside the cooling jackets.

It is well known that it is advantageous, when a wide field of observation is desired, to utilize objectives having a front pupil and having preferably a pupil which is positioned as close as possible to the field orifice, which is customarily positioned at the front end of the cooling jacket.

In these known constructions, the pupil is generally at a substantial distance from the first optical element of the objective, which necessitates the use of large lenses in order to obtain a wide field of observation. Such lenses are difficult to incorporate in mountings of small diameter.

The object of the present invention is to provide a new periscope adapted for use in observing high temperature environments characterized by the presence of particles which are moving turbulently at high speeds. This device is characterized by the fact that the front end of its cooling jacket is closed by a closure made of a material which is a very good conductor of heat and which supports a complementary optical element preferably mounted in alignment with the optical axis of the device. This optical element permits the entrance pupil to be positioned toward the front of the closure means so as to still further increase the field of observation of the apparatus, despite the substantial thickness of the closure means and the relatively large distance which may exist between the objective and said complementary optical element.

In one embodiment of the invention the complementary optical element consists of a thick sheet of material having parallel surfaces. Its front end is frusto-conical and this frusto-conical portion is positioned near the center of the front end of the closure means, so that the entrance pupil of the objective is positioned still further toward the front, where the frusto-conical portion of said complementary optical element is located. However, the field of observation of the device is not increased in this embodiment, and still depends upon the diameter of the first lens of the objective.

In another embodiment of the invention, the complementary optical objective has the same shape at the front, but has a spherically convex rear surface having its center coinciding with that of the plane front surface of said complementary optical element. This permits the field of observation to be increased substantially in proportion to that afforded by a device according to the first embodiment comprising a first objective lens of the same diameter.

Thus, in contradistinction to previous constructions, in which the field orifice of the objective is simply reduced and the entrance pupil placed as close as possible to the front end of the cooling jacket, the arrangement according to the present invention comprises a closure means mounted in front of the objective and which supports a complementary optical element. This closure means is pierced by passages which admit a current of air between the cooling jacket and the mounting and the objective. This air current then passes around the frusto-conical portion of the complementary optical element so as to form a cushion of air in front of the latter which prevents any projection of particles against its front surface.

This frusto-conical arrangement, in which the complementary optical element carried at the front of the closure means almost completely masks that surface of the objective which is turned toward the field of observation, has made it possible to eliminate those disadvantages resulting from the turbulent flow of air which have been observed in previous constructions in which air coming out at the level of the field orifices of the objectives was directed perpendicularly to the axis of that orifice and for this reason under went an abrupt turn at the level of said orifice.

In effect, the relatively great thickness of the closure means encircling the optical element permits the air surrounding this element to be more satisfactorily controlled, so as to insure a laminar flow, without the necessity of providing, as in certain previous construction, a second air passage along the axis of the field orifice so as to avoid any possibility of the projection of particles against the front surface of the objective.

Finally, the device constituting the invention, because the metal constituting the closure which is in contact with the wall of the cooling jacket is a good conductor of heat, and because of the substantial thickness between the objective and the front surface of the complementary optical element, prevents any heating of the objective.

The characteristics of the present invention will be better understood by reading the following description of two embodiments thereof, given purely by way of example, and with reference to the accompanying drawings, in which:

FIGURE 1 is an axial cross-section through a first embodiment of the invention comprising at its front end a complementary optical element having two parallel surfaces; and FIGURE 2 is an axial section through another embodiment of the invention providing a larger field and comprising as the complementary optical member an element having a convex rear face.

The optical device illustrated in FIGURE 1 comprises a cooling jacket 1, within which a cooling liquid is circulated through the passages 2. Closure means 3, made of a metal which is a good conductor of heat, is screwed on to interior threads 4 provided in the jacket 1.

The optical element 5 is mounted by means of ring 6 which is itself screwed into interior threads 7 at the closure means 3.

As seen in FIGURE 1, the ring 6 is pierced by passageways 8 which admit air blown along the passageway 9 between the cooling jacket 1 and the mounting 10 for the objective, in the direction of the arrows 11, toward the space 12 between the closure means 3 and the ring 6. This air then follows the path indicated by the arrows 13 to reach the conical annular space 14 separating the complementary optical element 5 from the closure means 3 and then forms an air cushion in front of the complementary optical element 5 as it flows out laminarly in the direction indicated by the arrows 15. Those optical elements carried in the mounting 10 are thus cooled at the same time that the complementary optical element 5 is cooled and heat radiation is prevented from reaching the mounting 10 and the optical elements therein.

It follows that the closure means 3 is cooled not only by the air currents following the direction of the arrows 13 and 15, but is also cooled by thermal conductivity, since it is in contact with the cooling jackets which are cooled by liquid under pressure flowing through the passages 2.

The cushion of air in front of the complementary optical element 5 moreover prevents any projection of solid particles against the relatively small front surface 16 of said optical element, thus preventing its opacification.

The path of a light ray has been traced on FIGURE 1, and it will be seen that the pupil through which optical rays enter, such as the ray 17, instead of being located within the optical element, is displaced by a distance proportional to the thickness of the member 5 and equal to the product of this thickness by $$\frac{u-1}{n}$$

with $n$ designating the index of refraction of the material of which this member is composed, so as to lie at the surface 16, that is to say, almost at the front end of the closure member 3.

However, the maximum inclination of rays such as the ray 18 arriving at this pupil is the same as that of corresponding rays of the type 17, so that the field of observation provided by such an optical device, taking into account the diameter of the first lens 19, is angularly limited to a width very little greater than that corresponding to the effective inclination of the ray 18.

In effect, rays which are too greatly inclined with respect to the axis of the device will, after two refractions, at the two surfaces of the complementary optical element, strike the mounting 10 and will not reach the lens 19.

It will be readily understood that the ring 6 may be made in several parts which are connected together radially so as to permit the complementary optical element 5 to be readily mounted within said ring 6.

Referring now to FIGURE 2, this shows the same type of cooling jacket 1 with the same liquid passages 2, the same closure member 3 and threads 4 and 7, but the complementary optical member 5a is different from the optical member 5 in that it is provided with a convex rear surface 5b. The mounting ring for the complementary optical member 5a is designated by reference character 6a. The means for mounting the objective is designated by the reference character 10a. FIGURE 2 shows that the light rays 17a enter the element 5a but diverge from the center of the surface 16, and no refraction of these rays occurs at the convex surface 5b because these rays are perpendicular to that spherical surface, the center of which is the same as that of the entrance pupil 16 of the optical device, which pupil coincides with the image given by the convex surface 5b.

It will be seen from the inclination of the ray 18a, which is refracted at 20 in the direction of the ray 17a, that the field of observation of the optical device of FIGURE 2, clearly is greater than that of the device shown in FIGURE 1.

In the embodiment of FIGURE 2, the entrance pupil coincides with the image given by the convex dioptic surface 5b and the element 5a no longer merely displaces the entrance pupil toward the front without thereby diminishing the field of observation, but also serves to substantially increase the width of this field because the rays are refracted only once at the surface of the entrance pupil and no refraction occurs at the dioptic convex surface, since the axis of the bundle of rays is travelling in a direction perpendicular to said convex surface 5b.

The protection against heat radiation of the optical elements inside the mounting 10a is provided for in exactly the same manner as in the device of FIGURE 1. The same is true of the laminar flow of air in front of the entrance pupil 16 which prevents any projection of particles against the pupil 16 and thus avoids any possibility of progressive opacification of the optical element 5a.

The convex surface 5b may, however, be provided with a special coating which refracts heat rays, and particularly infra red rays. This coating then serves as a concave mirror reflecting the infra red rays back toward the locality being observed, while passing visible radiation.

The heat rays are then completely reflected to the entrance pupil which is the best ventilated place, thus avoiding any possibility of overheating of the device, and permitting the utilization of entrance pupils having a greater diameter and consequently of more open and brighter objectives.

It will be appreciated that the embodiments described may be improved or altered as to detail and that elements thereof may be replaced by their mechanical equivalents without thereby departing from the spirit of the invention. In particular the diameter of the closure means may be reduced so that the cooling jackets may extend radially further inward toward the complementary optical element than in the embodiments illustrated.

The axis of the field of observation may also be displaced from the optical axis of the device by providing the latter with a prism the surfaces of which reflect the bundle of light rays one or more times. The axis of this bundle is then turned in the direction of the said optical axis, but the objective always remains in a position coaxial with that of the complementary optical element.

In other embodiments the ring supporting the complementary optical element may be mounted on the mounting means for the objective or on the cooling jacket or serve to connect said mounting means to the cooling jacket.

What is claimed is:

1. An optical viewing device for introduction into high temperature environments containing moving particles capable of damaging glass surfaces by impact thereagainst, said device comprising an elongated hollow cooling jacket defining a central passage, lens mounting means mounted within said passage, and an optical system including an objective carried by said lens mounting means near one end of said jacket, wherein the improvement comprises a transparent protective shield included as a component of said optical system and mounted in said one end of said jacket in optical alignment with but spaced from said objective, and mounting means for holding said shield in said jacket end, said mounting means being provided with passageways for admitting cooling air from said central passage to the periphery of said shield, and said shield comprising a solid frusto-conical portion having its largest diameter nearest said objective and its axis of symmetry in alignment with the optical axis of the objective, said frusto-conical portion cooperating with said jacket end to define an annular passageway adapted to form air received from said central passage through the passageways in said mounting means into a protective current which inhibits the impact of said particles against the end of said shield remote from said objective, the ends of said shield being flat parallel surfaces at which light passing through said shield is refracted and said remote end of said shield being positioned toward the front of said jacket end at the front principal focus of said optical system and constituting the entrance pupil of said device.

2. An optical viewing device for introduction into high temperature environments containing moving particles capable of damaging glass surfaces by impact thereagainst, said device comprising an elongated hollow cooling jacket defining a central passage, lens mounting means mounted within said passage, and an optical system including an objective carried by said lens mounting means near one end of said jacket, wherein the improvement comprises a transparent protective shield included as a component of said optical system and mounted in said one end of said jacket in optical alignment with but spaced from said objective, and mounting means for holding said shield in said jacket end, said mounting means being provided with passageways for admitting cooling air from said central passage to the periphery of said shield, and said shield comprising a solid frusto-conical portion having its largest diameter nearest said objective and its axis of symmetry in alignment with the optical axis of the objective, said frusto-conical portion cooperating with said jacket end to define an annular passageway adapted to form air received from said central passage through the passageways in said mounting means into a protective current which inhibits the impact of said particles against the end of said shield remote from said objective, the surface of said shield nearest said objective being convex and spherical while the surface thereof remote from said objective is flat, said remote surface being dimensioned and positioned to constitute the entrance pupil of the objective while lying at the front principal focus of said objective, and the center of said spherical surface being positioned at the center of said remote surface.

3. A device as claimed in claim 2 in which said jacket comprises hollow walls through which a cooling fluid may be circulated.

4. A device as claimed in claim 2 in which said shield mounting means is made of a material which is a good conductor of heat.

References Cited by the Examiner

UNITED STATES PATENTS

| 2,959,090 | 11/1960 | Davies | 88—1 |
| 3,080,755 | 3/1963 | Percy | 88—22.5 |

FOREIGN PATENTS

| Ad. 76,713 | 10/1961 | France. |
| 1,240,625 | 8/1960 | France. |

JEWELL H. PEDERSEN, *Primary Examiner.*

R. J. STERN, *Assistant Examiner.*